United States Patent [19]

Kitamura

[11] 4,447,136

[45] May 8, 1984

[54] SEMI-CONDUCTOR LASER DEVICE

[75] Inventor: Takashi Kitamura, Yokohama, Japan

[73] Assignee: Canon Kabushiki Kaisha, Tokyo, Japan

[21] Appl. No.: 281,727

[22] Filed: Jul. 9, 1981

[30] Foreign Application Priority Data

Jul. 18, 1980 [JP] Japan ................................. 55-98305

[51] Int. Cl.³ .............................................. G02B 3/02
[52] U.S. Cl. .................................... 350/432; 372/107; 372/108
[58] Field of Search ................. 350/432; 372/107, 108

[56] References Cited

U.S. PATENT DOCUMENTS 4,027,952 6/1977 Hugues .............................. 350/432

Primary Examiner—John K. Corbin
Assistant Examiner—Rebecca D. Gass
Attorney, Agent, or Firm—Fitzpatrick, Cella, Harper & Scinto

[57] ABSTRACT

A semi-conductor laser device has a semi-conductor laser chip and an aspherical single lens for collimating the light beam from the laser chip, said aspherical single lens being mounted in a beam exit port of a casing for protecting the laser chip, and said exit port of the casing being adapted to align the optical axis of the aspherical single lens with that of the laser chip.

9 Claims, 9 Drawing Figures

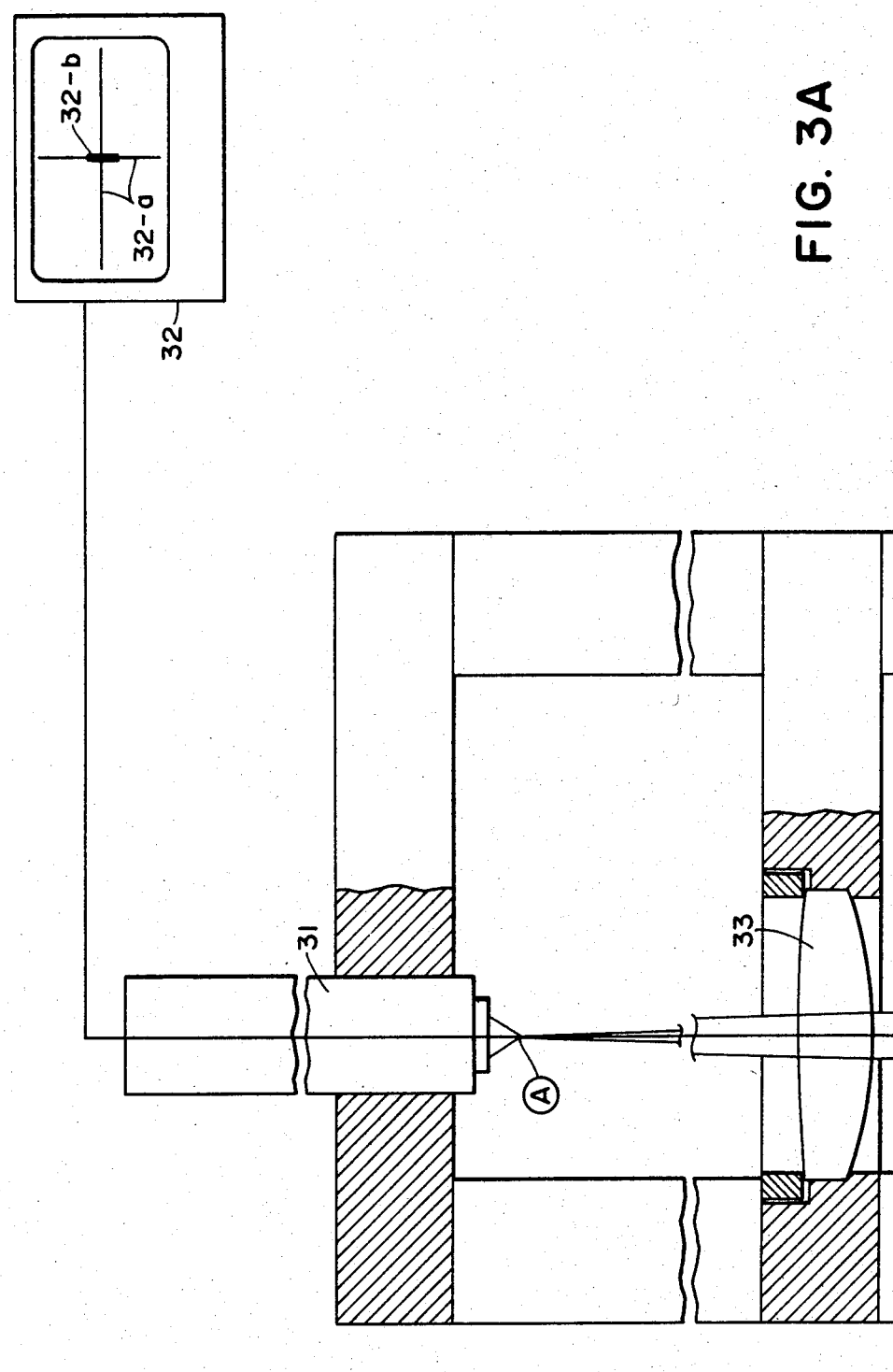

SEMI-CONDUCTOR LASER DEVICE

BACKGROUND OF THE INVENTION

1. Field of the Invention

The present invention relates to a semi-conductor laser device adapted for use as a light source for example for an electrophotographic recording apparatus, and more particularly to a compact semi-conductor laser device capable of providing a parallel beam by collimation of the emergent beam from a laser chip by means of an incorporated lens.

2. Description of the Prior Art

Though a semi-conductor laser chip generally emits a diverging light beam with a divergent angle of 10° to 40°, it is desirable to obtain a parallel beam from the semi-conductor laser device since the working efficiency becomes very low unless the beam is collimated with a lens in the vicinity of the light-emitting point, and also since a parallel beam is most convenient for optical handling.

The device already known for this purpose is composed, as shown in FIG. 1, of a lens unit 2 for collimating the diverging beam and an independent light-emitting unit 3, which are mechanically combined by connecting members 4 and 5. The lens unit 2 is composed of plural spherical lenses 2a, 2b, 2c for satisfying the required optical performance, with strict dimensional precision for each lens and for mutual relationship of the lenses.

The light-emitting unit 3 is provided with a casing 8 for protecting a laser chip 6 in a dry nigrogen atmosphere 7, in order to prevent the deterioration of said chip by oxidation caused by operation in ordinary atmosphere, said casing being equipped with a light-emitting glass port 9.

In the combination of these two units, a precise positioning is required with respect to the aberration between the optical axes and in focusing of the lens unit 2 and the laser chip 6.

If the optical axes are mutually aberrated, the beam emerging from the semi-conductor laser device becomes angularly aberrated from the optical axis of the lens unit 2, thus resulting in a beam displacement from the required position if the beam is utilized at a distant point from the light-emitting point. The tolerance for aberration of the optical axis, being determined as a function of the tolerance for said displacement, is generally in the range of $10\mu$.

Also if the focusing is aberrated, the beam emerging from the semi-conductor laser device is not strictly parallel. Thus, in case said beam is to be focused to a spot, such non-parallel beam provides a focal point displaced from the desired position, resulting in a blurred spot at said desired position. The tolerance for aberration in focusing, being determined as a function of the tolerance for said blur, is generally in the range of $5\mu$.

For the purpose of effectively collecting the light from a semi-conductor light-emitting element, Japanese Utility Model Laid-Open No. 9501/1980 discloses the use of an exit port having a light-converging lens function on the semi-conductor light-emitting element. However said invention is directed not to collimate the beam emerging from said element but to guide said beam effectively to a fiber bundle positioned in the vicinity of said exit port. Consequently the precision of mounting of said lens function element positioned close to the semi-conductor light-emitting element is far less critical than in the case of beam collimation.

SUMMARY OF THE INVENTION

The object of the present invention is to provide a semi-conductor laser device allowing easy and precise positioning of the collimating lens with respect to the semi-conductor laser chip.

Another object of the present invention is to provide a semi-conductor laser device containing a reduced number of component parts and thus allowing easy assembly.

Still another object of the present invention is to provide a compact semi-conductor laser device suitable for use in various recording or reading apparatus.

Still another object of the present invention is to provide a semi-conductor laser device allowing easy replacement of the semi-conductor laser chip with sufficient reproducibility.

Still another object of the present invention is to provide an apparatus capable of efficiently producing such semi-conductor laser devices.

The foregoing objects can be achieved in the present invention by a semi-conductor laser device having an aspherical single lens for beam collimation positioned on a beam exit port provided in a casing for protecting the semi-conductor laser chip, wherein the structure of said lens on the beam exist port allows precise adjustment of the position thereof with respect to the position of the semi-conductor laser chip.

DESCRIPTION OF THE PREFERRED EMBODIMENT

Figure 1:
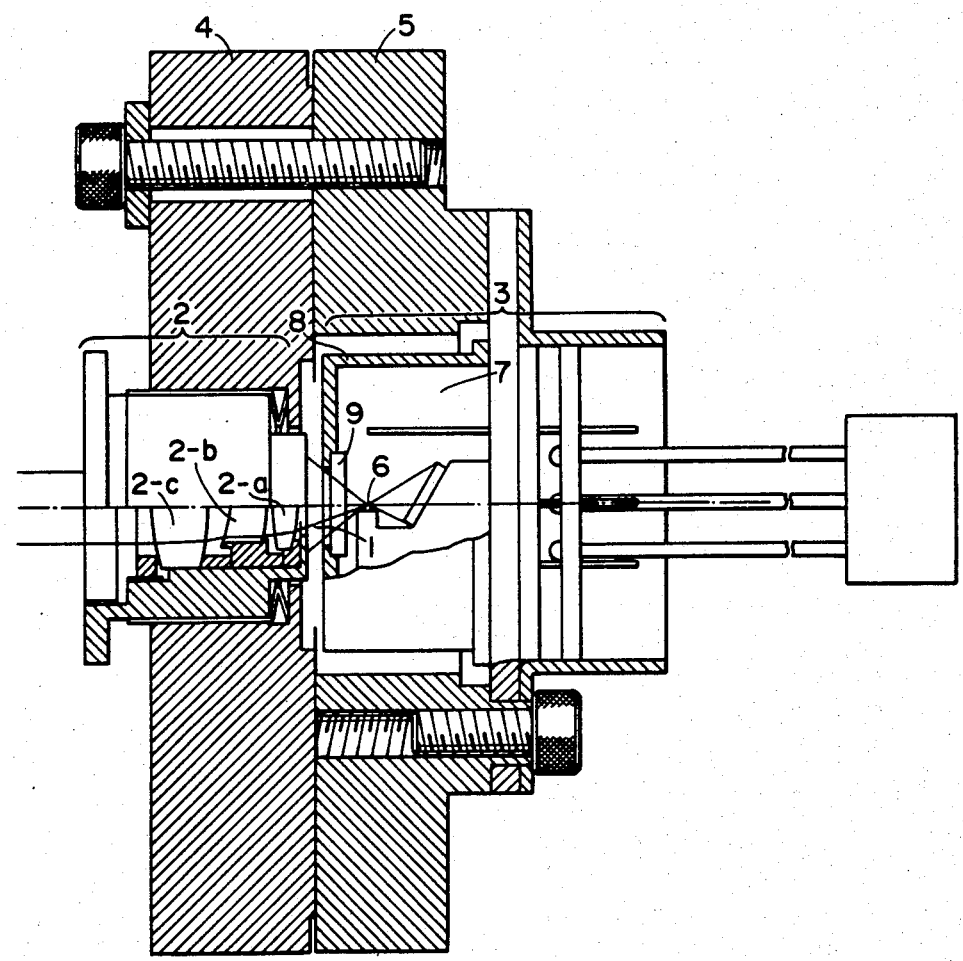
FIG. 1 is a cross-sectional view of a conventional semi-conductor laser device.
Figures 2, 3, 3A, 3B, 3C:
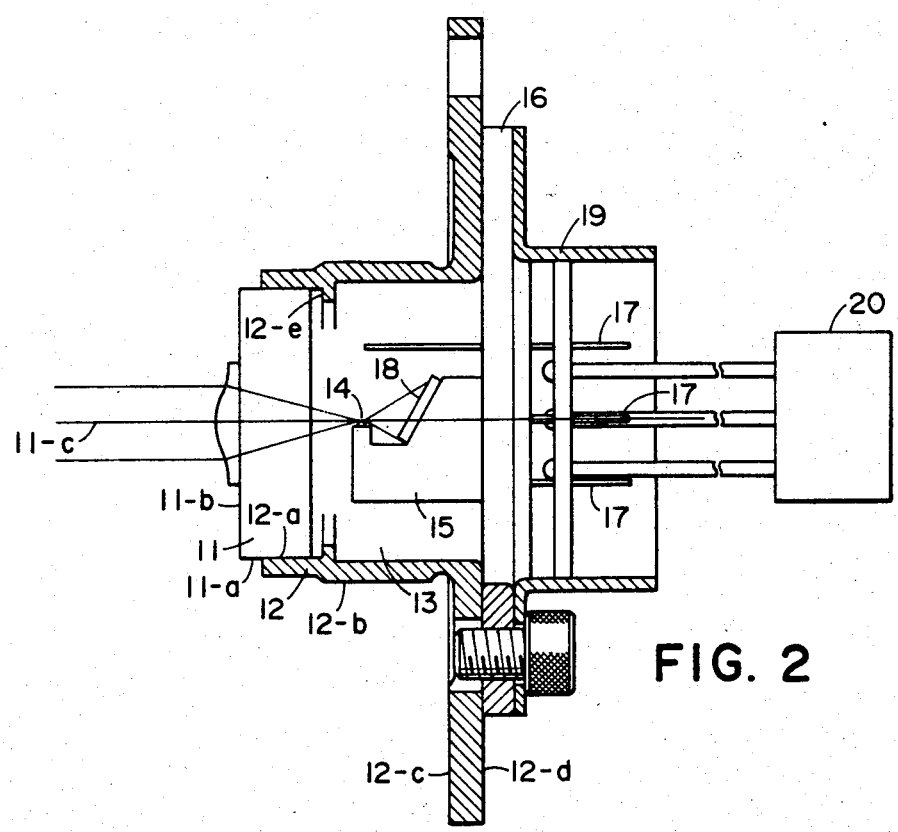
FIG. 2 is a cross-sectional view of a semi-conductor laser device embodying the present invention.
FIG. 3 shows the arrangement of FIGS. 3A, 3B and 3C.
FIGS. 3A, 3B and 3C are cross-sectional views of an embodiment of a jig for assembling the semi-conductor laser device of the present invention.
Figure 3B:
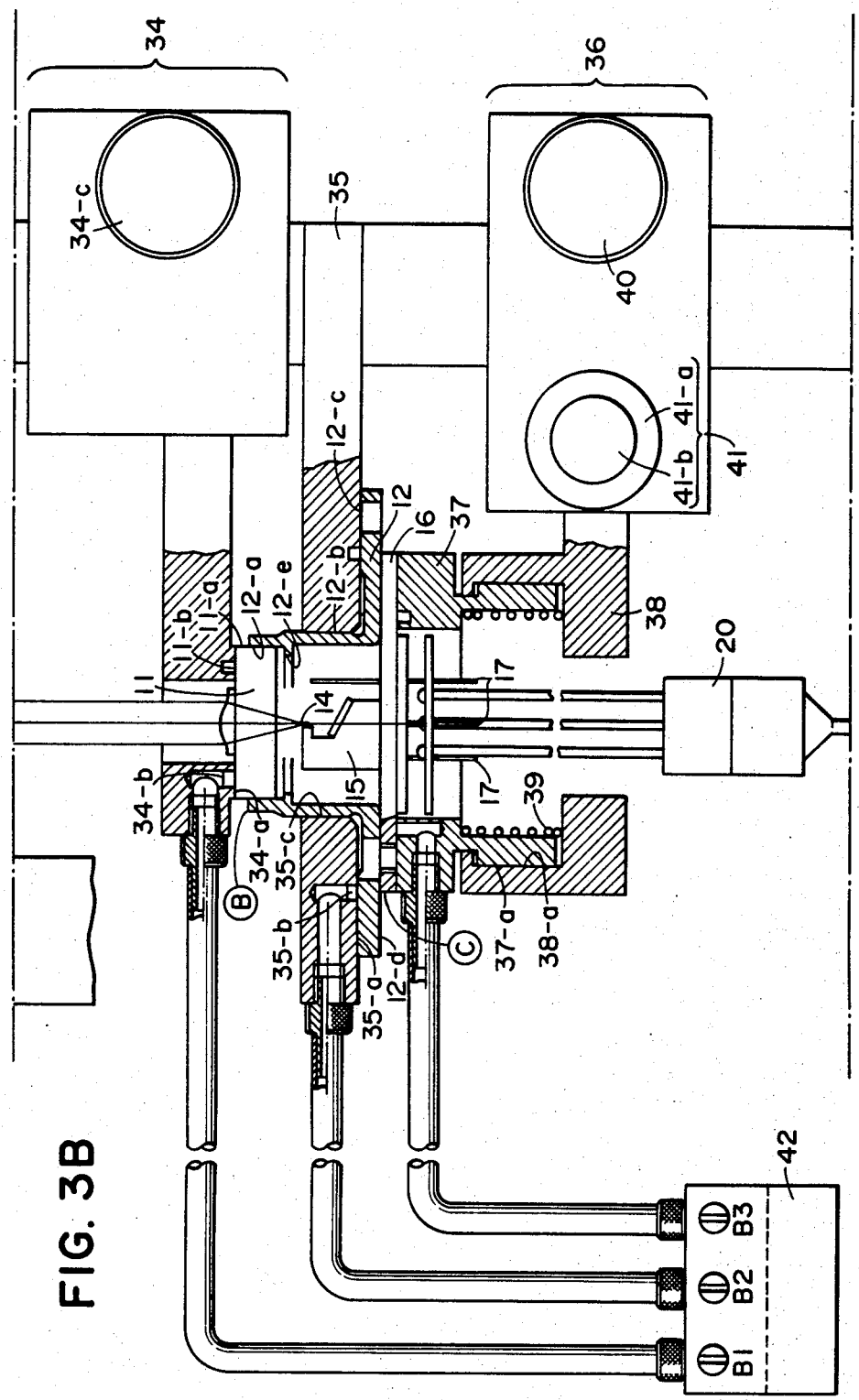
Figure 3C:
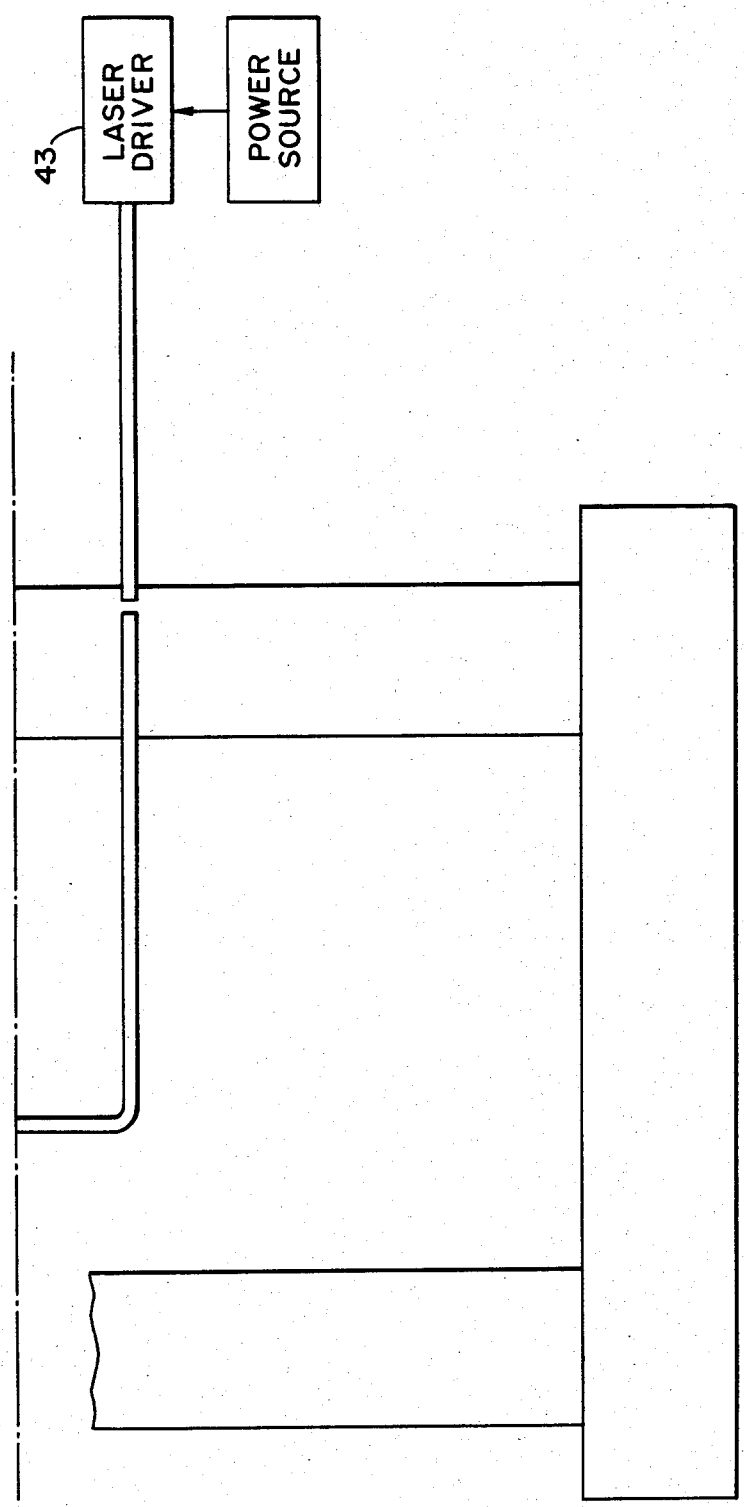

FIG. 2 shows an embodiment of the present invention, in which an aspherical single lens 11, functioning also as a laser beam exit port, is provided with a curved face 11a (external periphery in this case) concentric with the lens axis 11c and a flat face 11b perpendicular to said lens axis. A casing 12, functioning also as a member for mounting the semi-conductor laser device, is provided with a curved face 12a (internal periphery in this case) to be fitted with said external periphery 11a of the lens, a curved face 12b (external periphery in this case) concentric with said internal periphery 12a, and flat faces 12c and 12d perpendicular to said internal periphery 12a. The internal periphery 12a is provided with an inwardly protruding flange 12e. There are also provided a mount 15 for supporting said laser chip; a base member 16 for supporting said mount and various terminals 17 for power supply to the laser chip 14, for power supply to a beam detector 18 for automatic light intensity control and for transmitting output signals; a heat radiator plate 19 for radiating the heat generated by the laser chip 14 during the function thereof; and a connector 20 for power transmission between the laser device and the laser driver.

In order to achieve a desired optical performance in the above-mentioned structure, attention should be paid to the precision of the aspherical single lens itself, and the axial alignment and focusing of the aspherical single lens and the laser chip.

The use of an aspherical lens made of glass is not yet common but is advantageous in comparison with the preparation and mutual positioning of plural glass spherical lenses.

Also a molded aspherical lens is usable for this purpose. Although there exists a concern for the swelling by moisture of the molded material, the development of moisture-resistant material is progressing and is expected to be suitable for use in such lens in the future. FIG. 3 shows an example of jig for axial alignment and focusing of the aspherical single lens 11 and laser chip 14.

In said jig there are provided a television camera 31 for providing the image at a point A onto a television monitor 32; a focusing lens 33 so positioned as to have the focal point thereof at said point A; an aspherical lens holder 34 for supporting the aspherical lens 11 by suction in a vacuum groove 34b provided on an impinging face 34a perpendicular to the optical axis of said focusing lens 33, wherein the aspherical lens 11 is rendered vertically displaceable parallel to said optical axis by means of a knob 34c; a casing holder 35 for supporting the casing 12 of the semi-conductor laser device similarly by suction in a vacuum groove 35b provided on an impinging face 35a perpendicular to the optical axis of said focusing lens 33; wherein said casing holder 35 is provided with a central aperture 35c fitted with the external periphery 12b of the casing 12 and concentric with the optical axis of said focusing lens 33; a base holder 36 for supporting the base 16 of the semi-conductor laser device, composed of a base holder member 37 for supporting said base 16 and a base holder member 38 for displacing said member 37 in a direction perpendicular to the optical axis of the focusing lens 33, wherein said base holder member 37 is fitted at the external periphery 37a thereof with the internal periphery 38a of the base holder member 38 whereby said base holder member 37 is only movable in the vertical direction with respect to the base holder member 38 and is constantly biased upwards by a spring 39; a knob 40 for displacing the base holder 36 in the vertical direction; and knobs 41 having an external knob 41a and an internal knob 41b respectively for displacing the base holder 36 in a direction perpendicular to the plane of drawing and in a horizontal direction in the plane of drawing.

Now there will be explained the procedure of axis alignment and focusing of the aspherical single lens 11 and the laser chip 14 by means of the above-explained jig.

The procedure is conducted in a dry nitrogen atmosphere.

At first the aspherical single lens 11 and the casing 12 have to be supported. As preparation the aspherical lens 11 is put aside the casing 12 and supported by the protruding flange 12e which is provided for preventing the damage to the laser chip 14 by collision therewith of said aspherical lens 11 and which can therefore be suitably provided on said lens 11. Then the casing 12 is inserted into the central aperture 35c of the casing holder from below, and a valve B2 of a vacuum pump 42 is opened to support the casing 12 by suction when the flange face 12c impinges on the impinging face 35a. The external periphery 12b and flange face 12c of said casing 12 are prepared with precise concentricity and perpendicularity to the internal periphery 12a thereof as explained in the foregoing, and said external periphery 12b is exactly fitted in the central aperture 35c of the casing holder so that the central axis of said casing 12 in this state coincides with the optical axis of the focusing lens 33. Then the lens holder 34 is gradually lowered by the knob 34c until the impinging face 34a impinges on the flange face 11b of the aspherical lens 11 and a valve B1 of the vacuum pump 42 is opened to support the aspherical lens 11 by suction. The external periphery 11a and the flange face 11b of the aspherical lens 11 are prepared with precise concentricity and perpendicularity to the optical axis thereof, and said external periphery is exactly fitted in the internal periphery 12a of the casing 12, so that the optical axis of the aspherical single lens 11 coincides in this state with that of the focusing lens 33. Subsequently support is given to the base 16 which is already equipped with the laser chip 14, mount 15, terminals 17 and connector 20 so as to be ready for immediate laser function upon power supply thereto. The base holder 36 is brought to the lowest position by the knob 40, then the base 16 is placed on the base holder member 37, and a valve B3 of the vacuum pump 42 is opened to fix the base 16 by suction. In this operation the external periphery of the base 16 is approximately aligned with that of the base holder member 37 to facilitate the subsequent adjustment. The base holder 36 is elevated by the knob 40 until the upper face of the base 16 impinges on the lower face 12b of the casing, and the base holder 36 is further elevated slightly thereafter, whereby said upper face of the base 16 is pressed against the face 12d of the casing by the spring 39.

Successively the laser device is connected by the connector 20 to the laser driver 43 and is put into continuous oscillation. Along with the displacement of the base holder 36 in the direction perpendicular to the plane of the drawing or in the horizontal direction in said plane respectively by the knobs 41a, 41b, the base 16 supported by suction moves in the same directions along the lower face 12d of the casing by means of the spring 39. Simultaneously the aspherical lens 11 can be moved vertically by the knob 34c. The television monitor 32 shows a spot 32b without blur at the center of a scale 32a when a parallel beam enters the focusing lens 33 parallel to the optical axis thereof, or namely when the semi-conductor laser device emits a parallel beam in a direction perpendicular to the mounting face 12c thereof. Thus the mutual relationship of the aspherical single lens 11 and the laser chip 14 can be adjusted by turning said knobs 41a, 41b and 34c while observing the image shown on the television monitor 32. The lower face 12d of the casing is made perpendicular to the internal periphery thereof in order to maintain a constant distance between the laser chip and the aspherical single lens during the displacement of the laser chip 14 in a direction perpendicular to the optical axis of the focusing lens 33. After the completion of the above-mentioned adjustments, an adhesive material is supplied into the mutually fitting surface B between the aspherical lens 11 and the casing 12 and the mutually fitting surface C between the casing 12 and the base 16. Because of the small gap in these areas, the adhesive is hardened rapidly and provides a high strength to the external force. Finally the connector 20 is removed from the laser driver 43, then the valves B1, B2 of the vacuum pump 42 are closed, the laser device is lowered by turning the knob 40, and is removed by closing the valve B3 of said vacuum pump 42.

Figure 4:
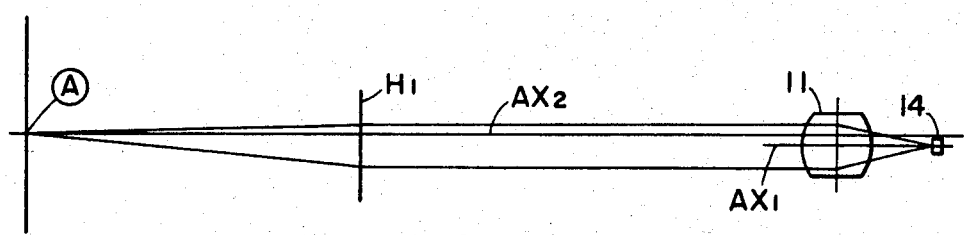
FIGS. 4 and 5 are schematic views showing the necessity of aligning the optical axes of the aspherical lens and of the focusing lens in the jig shown in FIG. 3.
Figure 5:
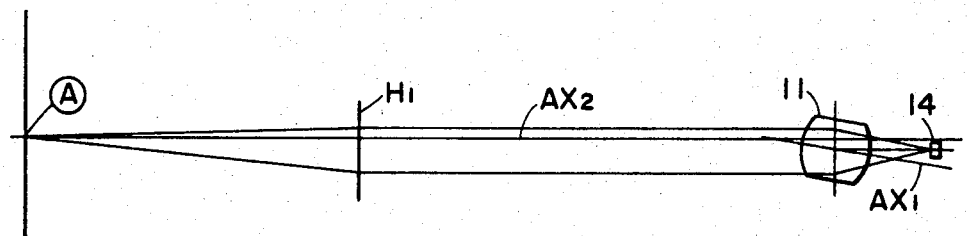

Now there will be explained the necessity of aligning the optical axis AX1 of the aspherical lens 11 with that AX2 of the focusing lens 33. If these axes are mutually parallel but are mutually eccentric as shown in FIG. 4, the beam does not coincide with the central axis of the mounting face, which is the external periphery 12c, of the semi-conductor laser device, even if the beam spot is formed at the point A by suitable displacement of the aspherical lens 11 and the laser chip 14. Such situation precludes the interchangeability of the devices as the relationship between the emerging parallel beam and the mounting face is not uniformly defined in all the devices. Also in case said optical axes are not mutually parallel as shown in FIG. 5, the light-emitting point of the laser chip 14 becomes positioned not on the optical axis of the aspherical lens 11, thus leading to a distorted spot or an increased light loss. H1 in FIGS. 4 and 5 indicates the principal plane of the focusing lens 33.

Furthermore such situations require increased factors in the adjustment precedure and thus a longer time for adjustment. For these reasons it is essential to align the optical axis of the aspherical lens 11 with that of the focusing lens 33, and the aspherical lens 11 and the casing 12 are provided with particular faces as the means for easily realizing such alignment.

Figure 6:
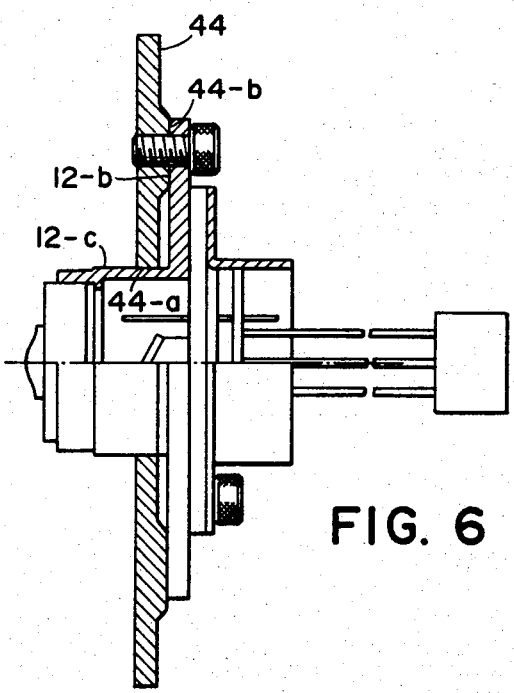
FIG. 6 is a cross-sectional view showing an embodiment of mounting the semi-conductor laser device of the present invention on another apparatus.

The semi-conductor laser device adjusted in the aforementioned manner is mounted, as shown in FIG. 6, for example on an outer wall 44 of an optical system of an electrophotographic recording apparatus. Said outer wall 44 is provided with an aperture 44a to engage with the external periphery 12b of the casing and a flange face 44b perpendicular to the central axis of said aperture, whereby the semi-conductor laser device is fitted by the external periphery 12b thereof with said aperture 44a in the outer wall, and is fixed by the impingement of the flange face 12c of the casing on the flange face 44b of said outer wall. Such structure ensures complete interchangeability of the semi-conductor laser device and eliminates the necessity for adjustment on every replacement of the device.

As explained in the foregoing, th semi-conductor laser device of the present invention permits a significant reduction in the number of component parts and eliminates the necessity for highly precise assembly work, through the use of an aspherical single lens as the optical system for collimating the beam emerging from the laser chip and also as a beam exit port of the laser device.

Also the aspherical single lens and the mounting member of the semi-conductor laser device are respectively provided with precisely prepared faces, thereby defining the emerging position and direction of the parallel beam in an extremely easy manner. The semi-conductor laser devices thus prepared have complete interchangeability and avoid optical adjustment at the replacement thereof. In addition to the foregoing, the device of the present invention is cheaper, more compact, more reliable and more easily serviceable in comparison with the conventional devices.

What I claim is:

1. A semi-conductor laser device, comprising:
    a semi-conductor laser chip for generating a laser beam;
    an aspherical single lens for collimating the laser beam from said semi-conductor laser chip, said lens having an outer peripheral surface extending in parallel to the optical axis thereof;
    a protective casing for said semi-conductor laser chip, said casing having an exit window for supporting therein said lens, said exit window having an inner peripheral surface formed for cooperation with said outer peripheral surface of said lens to permit movement of said lens only in the direction of the optical axis thereof during assembly of the semi-conductor laser device, said casing further having another surface extending perpendicularly to said inner peripheral surface of said exit window; and
    a base member for supporting said semi-conductor laser chip and having a mounting surface engaged with said other surface of said casing, said base member supporting said semi-conductor laser chip so as to generate the laser beam substantially perpendicularly to said other surface of said casing, said base member further being movable, relative to and along said other surface of said casing during assembly of the semi-conductor laser device, whereby focus adjustment of said lens and the alignment of said semi-conductor laser chip with said lens are permitted during assembly of said semi-conductor laser device.

2. A semi-conductor laser device according to claim 1, wherein said casing comprises means for limiting the position of said aspherical single lens relative to said exit window when said lens is assembled in said exit window.

3. A semi-conductor laser device according to claim 1, wherein said aspherical single lens comprises means for limiting the position thereof relative to said exit window when said lens is assembled in said exit window.

4. A semi-conductor laser device according to claim 1, wherein said casing has an assembly surface extending perpendicularly to said inner peripheral surface of said exit window, said assembly surface being adapted to be held by a case holder during assembly of the semi-conductor laser device.

5. A semi-conductor laser device according to claim 1, wherein said inner peripheral surface of said exit window is cylindrical about an axis, and said casing has a wall portion having an outer peripheral surface which is cylindrical about the axis of said inner peripheral surface of said exit window, said wall portion being adapted to be fitted into an opening formed in a case holder during assembly of the semi-conductor laser device.

6. A semi-conductor laser device according to claim 1, wherein said aspherical single lens has a surface portion perpendicular to the optical axis thereof, said surface portion being adapted to be held by a lens holder during assembly of the semi-conductor laser device.

7. A semi-conductor laser device according to claim 1, wherein said outer peripheral surface of said aspherical single lens is cylindrical about an axis coincident with the optical axis of said lens, and said inner peripheral surface of said exit window is cylindrical about the axis of said outer peripheral surface of said lens.

8. A semi-conductor laser device according to claim 7, wherein said casing comprises means for limiting the position of said aspherical single lens relative to said exit window when said lens is assembled in said exit window.

9. A semi-conductor laser device according to claim 7, wherein said aspherical single lens comprises means for limiting the position thereof relative to said exit window when said lens is assembled in said exit window.

* * * * *